(12) United States Patent
Hatakeyama et al.

(10) Patent No.: US 7,191,611 B2
(45) Date of Patent: Mar. 20, 2007

(54) VEHICULAR AIR CONDITIONING SYSTEM

(75) Inventors: Jun Hatakeyama, Sano (JP); Takehiko Kitagawa, Tatebayashi (JP); Masaharu Onda, Soka (JP)

(73) Assignee: Calsonic Kansei Corporation, Tokyo (JP)

(*) Notice: Subject to any disclaimer, the term of this patent is extended or adjusted under 35 U.S.C. 154(b) by 134 days.

(21) Appl. No.: 11/041,872

(22) Filed: Jan. 25, 2005

(65) Prior Publication Data

US 2005/0172653 A1   Aug. 11, 2005

(30) Foreign Application Priority Data

Jan. 29, 2004  (JP)  ................ P 2004-21867

(51) Int. Cl.
*B60H 1/32*  (2006.01)

(52) U.S. Cl. ................ 62/244; 165/42; 454/109

(58) Field of Classification Search ........... 62/244; 165/42–43; 454/108–109
See application file for complete search history.

(56) References Cited

U.S. PATENT DOCUMENTS 4,738,116 A * 4/1988 Himeno et al. ........... 62/186
5,187,943 A   2/1993 Taniguchi et al.
6,012,297 A * 1/2000 Ichishi et al. ............ 62/179
6,971,446 B2 * 12/2005 Price et al. .............. 165/203
2003/0136139 A1 * 7/2003 Matsunaga et al. ....... 62/244

FOREIGN PATENT DOCUMENTS

| DE | 198 35 931 A1 | 2/1999 |
| DE | 100 35 504 A1 | 1/2002 |
| DE | 100 46 628 A1 | 3/2002 |
| DE | 102 35 526 A1 | 2/2004 |
| JP | 62-29869 Y2 | 7/1987 |

\* cited by examiner

*Primary Examiner*—William E. Tapolcai
(74) *Attorney, Agent, or Firm*—Foley & Lardner LLP

(57) ABSTRACT

A vehicular air conditioning system of the present invention comprises an air conditioning unit which forms an air flow, a first vent 8 through which the air flow formed by the air conditioning unit is blown out toward a passenger, a second vent through which the air flow formed by the air conditioning unit is blown out in an upper direction of the vehicle, an air flow blowout switching unit which switches between blowout from the first vent, and blowout from the second vent at predetermined intervals. The air flow blowout switching unit includes a door unit which closes one of the first and the second vents and opens the other vent, and a control unit which controls the closed state and the opened state of the door unit.

18 Claims, 5 Drawing Sheets

VEHICULAR AIR CONDITIONING SYSTEM

BACKGROUND OF THE INVENTION

The present invention relates to a vehicular air conditioning system which blows air conditioning air flow from a front side and an upper side of an instrument panel of a vehicle into a passenger room.

The front side and the upper side of the instrument panel are provided with vents (a normal vent and an upper vent) through which air conditioning air flow (e.g., cold air for cooling or hot air for heating) blows into the passenger room. Air flow blows from the vents uniformly over the entire passenger room to make the passenger room comfortable.

In this case, since the air flow sent from the front side vent (conventional vent) of the instrument panel blows directly on a passenger, he/she can swiftly feel warm or cool. If air flow is sent from the upper side vent (upper vent) of the instrument panel, thermal stimulus or dynamic stimulus with respect to a passenger can be moderated.

Publication of Examined Utility Model Application, No. S62-29869 proposes a so-called swing louver type air conditioning system in which a rotation valve is provided immediately in front of a vent (conventional vent) of a front side of an instrument panel, and air flow sent from the vent can be changed in a widthwise direction of the vehicle so that air blows on a passenger at constant intervals. According to the air conditioning system, since a blowout area of the air flow can be changed in the vehicle widthwise direction, air blow from which a passenger does not feel wind speed, and spot air blow from which the passenger directly takes air flow can be realized by the front side vent of the instrument panel.

Blowing out of air flow from the upper vent can moderate stimulus on a skin caused by wind pressure on the passenger and resistance against wind, however, air flow does not reach the passenger and he/she may feel hot or cold.

According to the swing louver type air conditioning system proposed in the above publication, at the moment that the air flow is directed to positions other than the passenger, he/she does not feel warmth or coolness and thus, he/she feels hot or cold.

According to the swing louver type air conditioning system of the above publication, air is blown on a passenger seat by the swing louver from the driver's seat side vent and thus, air blows directly on the passenger on the passenger seat against his/her will.

Therefore, according to the swing louver type air conditioning system described in the above publication, even if air is blown from the upper vent, an air conditioning effect that is comfortable for the passenger cannot be obtained.

SUMMARY OF THE INVENTION

The present invention provides a vehicular air conditioning system capable of moderating the wind speed of air flow on a passenger, and capable of enhancing comfortableness of air conditioning in the passenger room.

According to a technical aspect of the present invention, there is provided a vehicular air conditioning system comprising: an air conditioning unit which forms air flow for air conditioning; a blowout unit provided on an instrument panel of a vehicle for blowing air flow formed in the air conditioning unit into a passenger room; and a blowout direction changing unit which changes a blowout direction of the air flow from the blowout unit in a vertical direction of the vehicle at predetermined intervals.

According to a second technical aspect of the present invention, in the vehicular air conditioning system, the blowout unit includes a first vent from which the air flow formed by the air conditioning unit is blown out toward a passenger, and a second vent from which the air flow is blown out to a direction other than the direction of the passenger; and the blowout direction changing unit includes an air flow blowout switching unit which switches between air flow from the first vent and air flow from the second vent at predetermined intervals.

According to a third technical aspect of the present invention, in the vehicular air conditioning system, the air flow blowout switching unit is provided in air conditioning ducts which respectively introduce air flow to the first vent and the second vent. The system further comprises: a door unit which closes one of the first vent and the second vent and opens the other one; and a controller which controls a closed state and an opened state of the door unit at predetermined intervals.

DESCRIPTION OF THE PREFERRED EMBODIMENTS

Exemplary embodiments of the present invention will be explained below with reference to the accompanying drawings.

Figure 1:
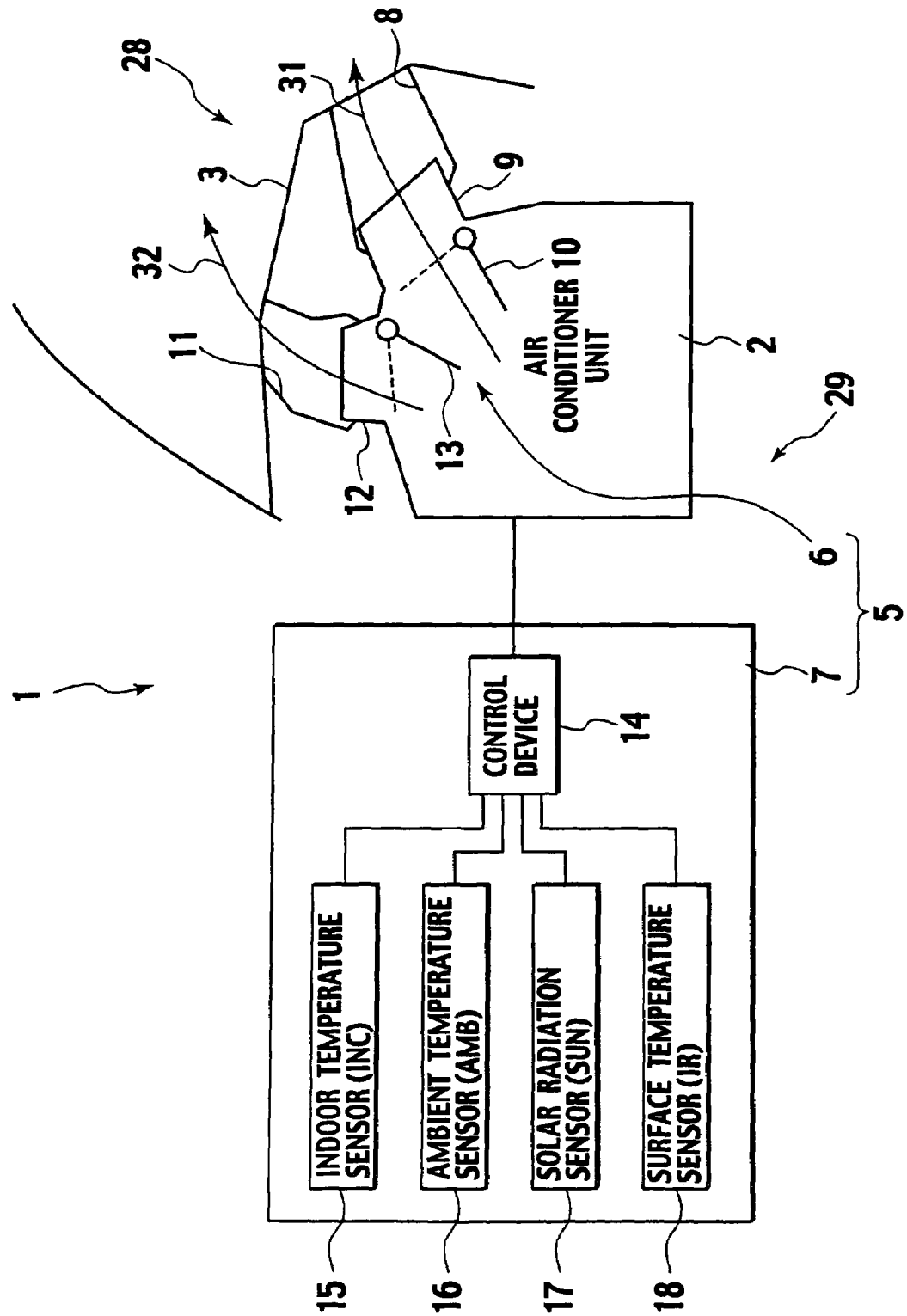
FIG. 1 is a schematic block diagram of a vehicular air conditioning system according to an embodiment of the present invention.
Figure 2:
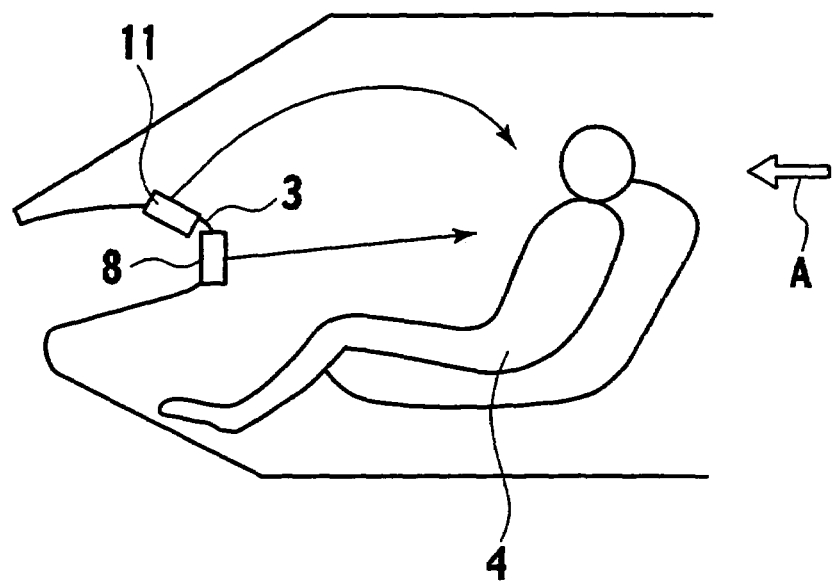
FIG. 2 is a side view showing an instrument panel in a passenger room.
Figure 3:
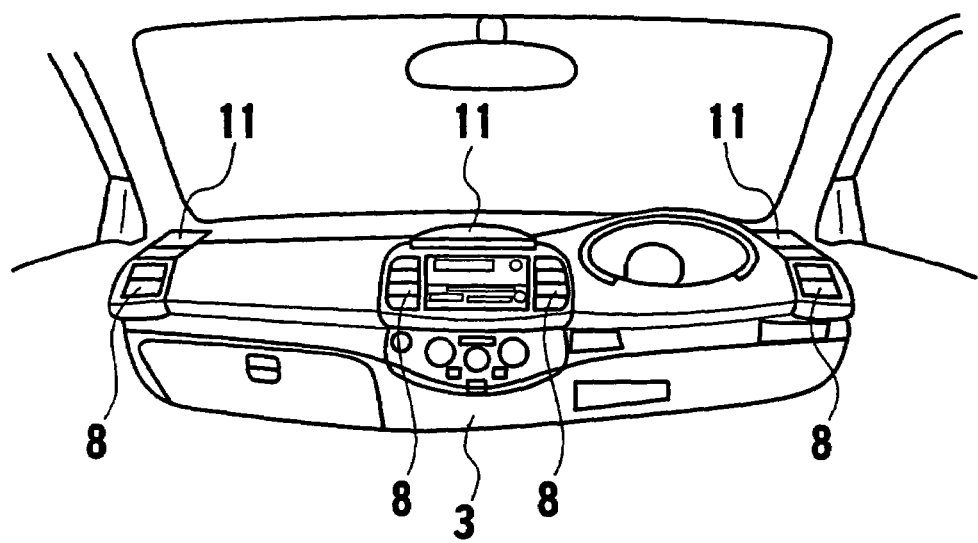
FIG. 3 is a view in the passenger room taken along the arrow A in FIG. 2.

FIG. 1 is a schematic block diagram of a vehicular air conditioning system 1 according to an embodiment of the present invention, FIG. 2 is a side view of an instrument panel 3 in a passenger room, and FIG. 3 is a front view showing the inside of the passenger room.

As shown in FIG. 1, the vehicular air conditioning system 1 according to the embodiment includes an air conditioning unit 2 which conditions air, a blowout unit 28 which is provided on the instrument panel 3 of the vehicle and which blows air flow for conditioning air formed by the air conditioning unit 2 into the passenger room, and a blowout direction changing unit 29 which changes a blowout direction of air from the blowout unit 28 such that the air blows toward the passenger at predetermined intervals. More specifically, the blowout direction can be changed in the vertical direction of the vehicle. The blowout unit 28 comprises first vents 8 provided on the front side of the instrument panel 3 of the vehicle and second vents 11 provided on the upper side of the instrument panel 3 of the vehicle. The air flow formed by the air conditioning unit 2 blows from the first vents 8 toward the passenger 4, and blows from the second vents 11 toward an upper side in the vertical direction of the vehicle. The blowout direction changing unit 29 comprises an air flow blowout switching unit 5 which switches between air blowout from the first vent 8 and air blowout from the second vent 11 at predetermined intervals.

The air conditioning unit 2 comprises a blower, an evaporator, a heater core, a mix door, an air conditioning duct for introducing air flow, and the like. These members are integrally accommodated in a casing. The air flow is introduced into the air conditioning ducts 9 and 12 from the air conditioning unit 2, and is blown into the passenger room from the first and the second vents 8 and 11.

As shown in FIGS. 2 and 3, four first vents 8 are provided. That is, two first vents 8 are provided on opposite sides on the front side of the instrument panel 3 one each, and two first vents 8 are provided at central portions. Three second vents 11 are provided on the upper side of the instrument panel 3 in such a manner that two second vents 11 are provided on the opposite sides one each, and one second vent 11 is provided on the central portion. The first vents 8 are so-called normal vents, and air is blown on the front seat passenger directly. The second vents 11 are so-called upper vents, and air is indirectly blown in a direction other than the front seat passenger, i.e., toward a position above a head of the front seat passenger. Air is blown from the first and the second vents 8 and 11 alternately by the air flow blowout switching unit 5 at predetermined intervals.

The air flow blowout switching unit 5 comprises a door unit 6 and a control unit 7. The door unit 6 is provided in the air conditioning ducts 9 and 12 (in this embodiment, in the air conditioning duct in the air conditioning unit 2) through which air is introduced to the first and the second vents 8 and 11. The door unit 6 closes one of the first and the second vents 8 and 11 and opens the other one. The control unit 7 controls the closing state and the opening state of the door unit 6 at predetermined intervals.

The door unit 6 comprises a first door 10 and a second door 13. The first door 10 is provided in the air conditioning duct 9 which introduces air flow 31 to the first vent 8. The first door 10 is switched between a closing state where the air flow to the first vent 8 is blocked and an opening state where air flow 32 is supplied to the first vent 8. The second door 13 is provided in the air conditioning duct 12 which introduces air flow to the second vent 11. The second door 13 is switched between a closing state where the air flow to the second vent 11 is blocked and an opening state where air flow 32 is supplied to the second vent 11.

The control unit 7 comprises a control device 14 connected to the air conditioning unit 2 for controlling operations of the first and the second doors 10 and 13 in the air conditioning unit 2, an indoor temperature sensor (INC) 15 which detects the temperature in the passenger room being connected to the control device 14, an ambient temperature sensor (AMB) 16 which detects the ambient temperature, a solar radiation sensor (SUN) 17 which detects solar radiation, and a surface temperature sensor (IR) 18 which detects the surface temperature of the passenger.

The control device 14 controls vertical swing wind based on results detected by the sensors 15 to 18. That is, the control device 14 opens one of the first and the second doors 10 and 13 and closes the other one at predetermined intervals.

Figure 4:
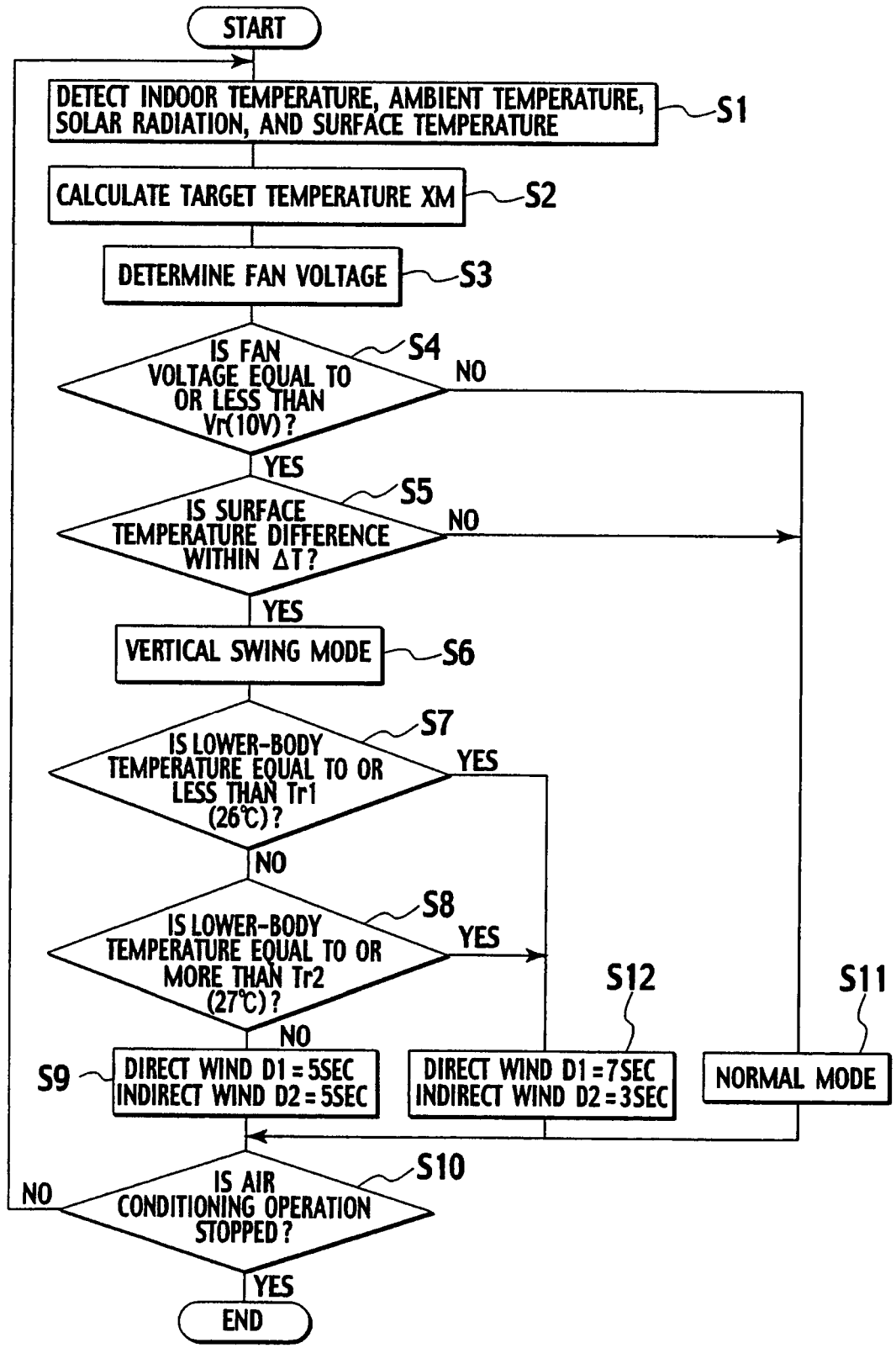
FIG. 4 is a flowchart showing control procedure in a vertical swing mode of control in a vertical swing mode of a control device.

The control method of the control device 14 shown in FIG. 4 will be explained.

If the air conditioning in the passenger room is started, at step S1, the indoor temperature, the ambient temperature, the solar radiation, the surface temperature of a passenger are detected by the indoor temperature sensor 15, the ambient temperature sensor 16, the solar radiation sensor 17 and the surface temperature sensor 18, respectively. At step S2, the control device 14 calculates a target value (temperature) Xm that is most suitable in the passenger room based on these detection results. Based on the target value Xm, fan voltage of a fan motor (not shown) of the blower of the air conditioning unit 2 is obtained at step S3.

At step S4, determination is made as to whether the obtained fan voltage is equal to or less than a reference voltage Vr (e.g. 10 V). If the fan voltage is equal to or less than the reference voltage, it is determined that the temperature in the passenger room is not excessively low or excessively high. In this case, when it is determined that the temperature in the passenger room is excessively low or excessively high, an air conditioning control in a normal mode is carried out at step S11. That is, conditioned air flows 31 and 32 are blown from the first and the second vents 8 and 11 at the same time.

If it is determined that the temperature in the passenger room is not excessively low or excessively high at step S4, determination is made at step S5 as to whether a surface temperature difference of various portions of a body of the passenger, i.e., a temperature difference between an upper-body and a lower-body of the passenger is within a predetermined temperature $\Delta T$ (e.g. 3° C.). That is, if the temperature difference between the upper-body and the lower-body of the passenger is equal to or greater than the predetermined temperature, only the upper-body is rapidly cooled or warmed and thus local air conditioning is required, but if the temperature difference between the upper-body and the lower-body of the passenger is less than the predetermined temperature, such local air conditioning is unnecessary. Thus, at step S6, the "vertical swing" mode in which air is alternately blown from the first vent (normal vent) 8 and the second vent (upper vent) 11 is started.

If the vertical swing mode is started at step S6, determination is made at step S7 as to whether the lower-body temperature is equal to or lower than a first reference temperature Tr1. At step S8, determination is made as to whether the upper-body temperature is equal to or higher than a second reference temperature Tr2. Here, Tr1 $\leq$ Tr2, and typically Tr1 is 26° C. and Tr2 is 27° C. That is, in order to determine the predetermined intervals in the vertical swing mode to set the blowout time of the air flow from the first vent 8 and the blowout time from the second vent 11, the surface temperature of each of the lower-body and the upper-body is determined. If the lower-body temperature is not equal to or lower than the first reference temperature Tr1 and the upper-body temperature is not equal to or higher than the second reference temperature Tr2, the blowout of the air flow (direct wind to the passenger) from the first vent 8 is set to a first duration D1, and the blowout time of the airflow from the second vent 11 is set to a second duration D2 at step S9. Typically, D=D1=D2 and D is set to 5 seconds, for example. In this case, there is no difference between the surface temperature of the upper-body and the surface temperature of the lower-body of the passenger, and both the upper-body and lower-body do not have locally low temperature portions. Therefore, the air conditioning mode is set to the vertical swing mode in which conditioned air is alternately blown out from the first vent 8 and the second vent 11 at intervals D. In this case, the blowout direction passes the direction of a passenger at intervals 2D.

If the surface temperature of the passenger is equal to or lower than the first reference temperature Tr1 at step S7, or if the surface temperature of the passenger is equal to or higher than the second reference temperature Tr2 at step S8, the direct blowout duration (first duration D1) from the first vent 8 is set greater than the indirect blowout duration (second duration D2) from the second vent 11 at step S12. In this case, D1 is set to 7 seconds, and D2 is set to 3 seconds. By increasing the blowout time from the first vent 8, more air flow (direct wind) is blown on the passenger. In this case, the blowout direction passes the direction of a passenger at intervals of D1+D2.

Determination is made at step S10 as to whether the air conditioning is stopped. If the air conditioning is stopped, the above control is completed, and if the air conditioning is not stopped, the procedure of step S1 and subsequent steps is repeatedly carried out.

According to this embodiment, the control unit 7 changes the blowout of air flow from the first blowout unit and the second blowout unit at predetermined intervals. Therefore, for example, air is directly blown on a passenger at times as compared with a case where air is blown only from the upper side first vent 8 of the instrument panel 3, and cooling and warming effects and comfortableness are enhanced.

As compared with the conventional air conditioning system which guides the air flow in the vehicle widthwise direction, air is blown directly on a passenger at predetermined intervals and thus, the passenger can always feel coolness or warmth.

Therefore, the flow rate of wind and wind speed at a portion of the passenger against which air is blow are reduced. As a result, thermal or dynamic stimulus on the skin of the passenger caused by the air flow can be moderated, and air conditioning comfortableness in the passenger room can be enhanced.

Modification

Modifications of the present invention will be explained next.

Figure 5:
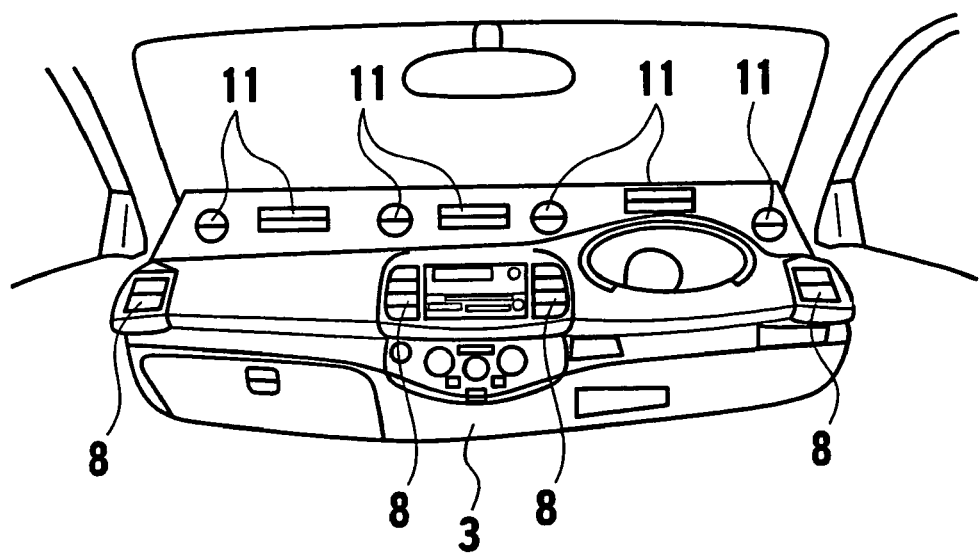
FIG. 5 is an arrow view of the instrument panel in the passenger room taken along the same direction as that in FIG. 3.

The first vents 8 and the second vents 11 may not be arranged as shown in FIG. 3, and may be arranged as shown in FIG. 5. That is, two first vents 8 may be provided on opposite sides on the front side of the instrument panel 3 one each, and two first vents 8 are provided at central portions. Circular second vents 11 or rectangular second vents 11 may be provided alternately on the upper side of the instrument panel 3.

In order to switch the air flow, as shown in the embodiment shown in FIG. 1, the air conditioning duct 9 which is integrally provided in the air conditioning unit 2 for introducing the air flow into the first vent 8 may be provided with the first door 10, and the air conditioning duct 12 which introduces the conditioned air into the second vent 11 may be provided with the second door 13. Alternatively, as shown in FIG. 6, an air conditioning duct 19 for introducing the conditioned air from the air conditioning unit 2 into the first vent 8 and the second vent 11 may be provided separately from the air conditioning unit 2, and the air conditioning duct 19 may be provided at its branch portion with a branch door 20, thereby switching the air flow to the first vent 8 and the second vent 11.

Figure 6:
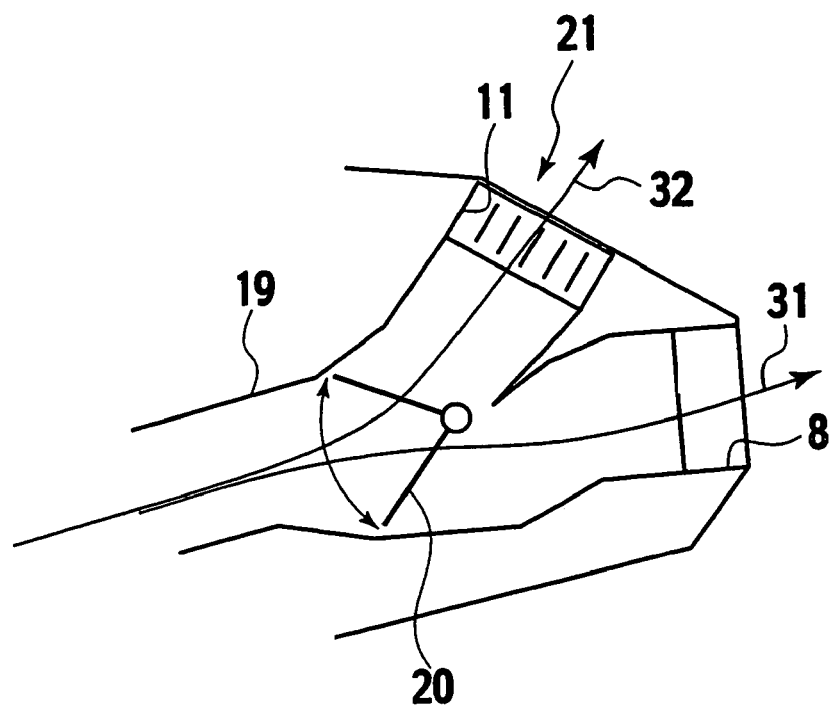
FIG. 6 is a side view showing a first vent and a second vent according to a modification.
Figure 7:
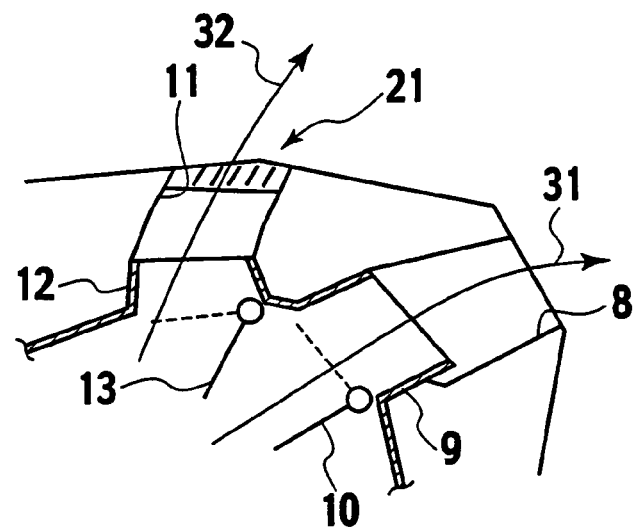
FIG. 7 is a side view showing a first vent and a second vent according to another modification.
Figure 8:
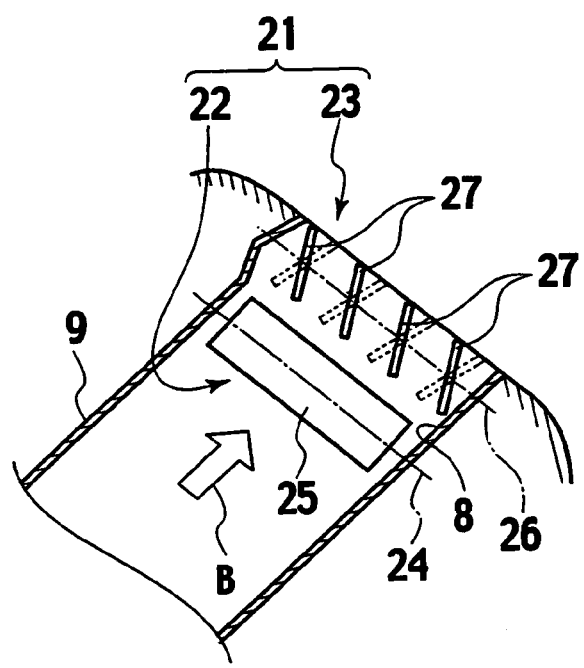
FIG. 8 is a side view of a movable louver mounted on the first vent.

Alternatively, as shown in FIGS. 6 and 7, the first vent 8 maybe provided at its open edge with a movable louver 21 capable of changing the blowout direction of the air flow. As shown in FIG. 8, the movable louver 21 comprises a widthwise direction changing louver 22 which guides the air flow blown from the second vent 11 in the widthwise direction of the vehicle, and a vertical direction changing louver 23 which guides the air flow in the vertical direction. The widthwise direction changing louver 22 comprises a rotation support shaft 24 which is disposed in the air conditioning duct 12 in a direction intersecting with a flowing direction (depicted by the arrow B) of the air flow, and a guide plate 25 rotatably supported on the rotation support shaft 24. If the guide plate 25 is turned around the rotation support shaft 24, the guide plate guides the air flow in the widthwise direction of the vehicle. The vertical direction changing louver 23 is disposed closer to the opening edge than the widthwise direction movable louver.

The vertical direction changing louver 23 comprises a rotation support shaft 26, and four guide pieces 27, 27, 27 and 27 turnably supported by the rotation support shaft 26 at predetermined distances from one another. If the four guide pieces 27, 27, 27 and 27 are turned around the rotation support shaft 26, the blowout angle of the air flow can be changed vertically. If the widthwise direction changing louver 22 and the vertical direction changing louver 23 are manually operated to change the direction of the air flow to suit the needs of a passenger, the blowout direction of the air flow can be set to suit the needs of a passenger, and comfortable air conditioning can be obtained.

In the "vertical swing" mode explained above, the blowout time of air flow from the first vent 8 and the blowout time of air flow from the second vent 11 are respectively changed, and the blowout of air flow is controlled alternately at intervals as shown in steps S9 and S12. The flow rate of air being blown out from the first vent 8 and the second vent 11 may be changed of course. In this case, the amount of wind to the passenger may directly be increased by increasing the flow rate of wind from the first vent 8 instead of increasing the time during which air is alternately blown out from the first and the second vents 8 and 11, or the amount of indirect wind may be increased by increasing the flow rate of air from the second vent 11 on the contrary.

Even when one of the first and the second doors 10 and 13 is opened and the other one is closed, the closed door may not block the air flow completely, and a very small amount of air (slight wind) may be blown out from the vent. In this case, the flow rate of air which flows from the upper and lower vents 8 and 11 is changed by switching between strong and weak.

The blowout direction of air flow from the first vent 8 may be changed in the vertical direction at predetermined intervals by using the first vent 8 which is a normal vent as the blowout unit and using the vertical direction changing louver 23 as a blowout direction changing unit. In this case, if the rotation support shaft 26 of the vertical direction changing louver 23 is driven by a motor or the like, the vertical direction changing louver 23 can be turned automatically.

According to the present invention, the blowout direction changing unit changes the blowout direction of air flow from the blowout unit into the passenger room in the vertical direction of the vehicle at predetermined intervals, and the air is blown out into the passenger room. Therefore, air is directly blown on a passenger at times as compared with a case where air is blown only in one direction from the vent of the instrument panel, and cooling and warming effects and comfortableness are enhanced.

When the blowout units are the first and the second vents, the air flow blowout switching unit switches the blowout of air from the first vent and the blowout of air from the second vent at predetermined intervals. Therefore, air is directly blown on a passenger at times as compared with a case where air is blown only from the first vent of the upper side of the instrument panel, and cooling and warming effects and comfortableness are enhanced.

As compared with the conventional air conditioning system which guides the air flow in the vehicle widthwise direction, air is blown directly on a passenger at predetermined intervals and thus, the passenger can always feel coolness or warmth. Thus, stimulus on a passenger caused by air flow can be moderated, and the comfortableness of air conditioning in the passenger room can be enhanced.

This application claims benefit of priority under 35 USC §119 to Japanese Patent Applications No. 2004-021867, filed on Jan. 29, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicular air conditioning system comprising:
   an air conditioning unit forming air flow for air conditioning;
   a blowout unit being provided on an instrument panel of a vehicle for blowing air flow formed in the air conditioning unit into a passenger room; and
   a blowout direction changing unit changing a blowout direction of the air flow from the blowout unit in a vertical direction of the vehicle at predetermined intervals,
   wherein the blowout unit includes a first vent from which the air flow formed by the air conditioning unit is blown out toward a passenger, and a second vent from which the air flow is blown out to a direction other than the direction of the passenger; and
   wherein the blowout direction changing unit includes an air flow blowout switching unit which switches between air flow from the first vent and air flow from the second vent at predetermined intervals.

2. The vehicular air conditioning system according to claim 1, wherein
   the air flow blowout switching unit is provided in air conditioning ducts which respectively introduce air flow to the first vent and the second vent,
   the vehicular air conditioning system further comprises:
      a door unit closing one of the first vent and the second vent and opening the other one of the first vent and the second vent; and
      a control unit controlling a closed state and an opened state of the door unit at predetermined intervals.

3. The vehicular air conditioning system according to claim 2, wherein the door unit includes:
   a first door which is provided in the air conditioning duct introducing the air flow to the first vent and which is switched between a closed state where air flow to the first vent is blocked and an opened state where air flow is supplied to the first vent; and
   a second door which is provided in the air conditioning duct introducing air flow to the second vent and which is switched between a closed state where air flow to the second vent is blocked and an opened state where air flow is supplied to the second vent; and wherein the control unit opens one of the first door and the second door and closes the other door of the first door and the second door at predetermined intervals.

4. The vehicular air conditioning system according to claim 2, wherein the control unit controls air flows blown out from the first vent and the second vent such that the air flows have different flow rates.

5. The vehicular air conditioning system according to claim 3, wherein the control unit controls air flows blown out from the first vent and the second vent such that the air flows have different flow rates.

6. The vehicular air conditioning system according to claim 3, wherein two or more first vents and two or more second vents are provided; and the control unit allows air to blow out from any of the first vents and the second vents.

7. The vehicular air conditioning system according to claim 4, wherein two or more first vents and two or more second vents are provided; and the control unit allows air to blow out from any of the first vents and the second vents.

8. The vehicular air conditioning system according to claim 5, wherein two or more first vents and two or more second vents are provided; and the control unit allows air to blow out from any of the first vents and the second vents.

9. The vehicular air conditioning system according to claim 1, wherein the blowout unit is provided with a vertical direction changing louver which guides air flow blown out into the passenger room in the vertical direction of the vehicle.

10. The vehicular air conditioning system according to claim 2, wherein the blowout unit is provided with a vertical direction changing louver which guides air flow blown out into the passenger room in the vertical direction of the vehicle.

11. The vehicular air conditioning system according to claim 3, wherein the blowout unit is provided with a vertical direction changing louver which guides air flow blown out into the passenger room in the vertical direction of the vehicle.

12. The vehicular air conditioning system according to claim 6, wherein the first door and the second door allow a very small amount of air to blow out from the first vent and the second vent in a state in which the first door and the second door are in the closed state.

13. The vehicular air conditioning system according to claim 8, wherein the first door and the second door allow a very small amount of air to blow out from the first vent and the second vent in a state in which the first door and the second door are in the closed state.

14. The vehicular air conditioning system according to claim 11, wherein the first door and the second door allow a very small amount of air to blow out from the first vent and the second vent in a state in which the first door and the second door are in the closed state.

15. The vehicular air conditioning system according to claim 3, wherein the first door and the second door allow a very small amount of air to blow out from the first vent and the second vent in a state in which the first door and the second door are in the closed state.

16. The vehicular air conditioning system according to claim 2, further comprising a surface temperature detecting unit detecting a surface temperature of the passenger,
   wherein the control unit obtains predetermined intervals based on a detection result of the surface temperature detecting unit, and switches the blowout intervals of air flow from the first vent and the second vent.

17. The vehicular air conditioning system according to claim 3, further comprising a surface temperature detecting unit detecting a surface temperature of the passenger,
wherein the control unit obtains predetermined intervals based on a detection result of the surface temperature detecting unit, and switches the blowout intervals of air flow from the first vent and the second vent.

18. The vehicular air conditioning system according to claim 16, wherein the surface temperature detecting unit is a temperature detector using infrared rays.

* * * * *